United States Patent Office 3,660,410
Patented May 2, 1972

3,660,410
N-ACYL-PARA-DIALKYLAMINOPHENYL-HYDRAZONES
Karl Heinz Büchel, Wuppertal-Elberfeld, Ferdinand Grewe, Burscheid, and Paul-Ernst Frohberger and Helmut Kaspers, Leverkusen, Germany, assignors to Farbenfabriken Bayer Aktiengesellschaft, Leverkusen, Germany
No Drawing. Filed Nov. 13, 1969, Ser. No. 876,589
Claims priority, application Germany, Nov. 23, 1968, P 18 10 581.2
Int. Cl. C07c 103/42
U.S. Cl. 260—293.76       7 Claims

ABSTRACT OF THE DISCLOSURE

N - acyl - para - dialkylaminophenyl - hydrazones, i.e. N - (4 - dialkylamino- and 4 - tetra to penta methyleneimino-substituted phenyl)-N-(alkanoyl, chloroalkanoyl, alkenoyl, carboalkoxy, benzoyl and carbophenoxy)-N'-[(acetyl and cyano)-(alkanoyl and carboalkoxy)-carbonyl]-hydrazones, or N-(4-dialkylamino-, 4-pyrrolidino- and 4-piperidino-substituted phenyl)-N-(alkylcarbonyl, chloroalkylcarbonyl, alkenylcarbonyl, alkoxycarbonyl, phenylcarbonyl and phenoxycarbonyl)-N'-[(methylcarbonyl and cyano)-(alkylcarbonyl and alkoxycarbonyl)-carbonyl]-hydrazones, which possess fungicidal properties and which may be produced by conventional methods.

The present invention relates to and has for its objects the provision for particular new N - acyl - para - dialkylaminophenyl-hydrazones, i.e. N - (4 - dialkylamino- and 4-tetra to penta methylene - imino - substituted phenyl)-N-(alkanoyl, chloroalkanoyl, alkenoyl, carboalkoxy, benzoyl and carbophenoxy) - N' - [(acetyl and cyano)-(alkanoyl and carboalkoxy) - carbonyl] - hydrazones, or N-(4-dialkylamino-, 4-pyrrolidino- and 4-piperidino-substituted phenyl) - N - (alkylcarbonyl, chloroalkylcarbonyl, alkenylcarbonyl, alkoxycarbonyl, phenylcarbonyl and phenoxycarbonyl)-N'-[(methylcarbonyl and cyano)-(alkylcarbonyl and alkoxycarbonyl) - carbonyl]-hydrazones, which possess fungicidal properties, active compositions in the form of mixtures of such compounds with solid and liquid dispersible carrier vehicles, and methods for producing such compounds and for using such compounds in a new way especially for combating fungi, with other and further objects becoming apparent from a study of the within specification and accompanying examples.

It has now been found, in accordance with the present aminophenyl-hydrazones are effective against fungi which are pathogenic to plants, such as Phytophthora species (cf. British Pat. 920,739).

It has now been found, in accordancew ith the present invention, that the particular new N-acyl-para-dialkylaminophenyl-hydrazones of the formula

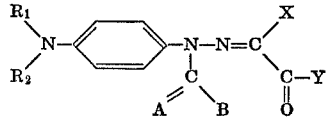

in which

X is methylcarbonyl or cyano,
Y is alkyl of 1–4 carbon atoms or alkoxy of 1–4 carbon atoms,
R₁ and R₂ each individually is alkyl of 1–4 carbon atoms,
R₁ and R₂ when taken together form an alkylene bridge having 4–5 methylene groups,
A is oxygen, and
B is alkyl of 1–10 carbon atoms, chloroalkyl of 1–4 carbon atoms, alkenyl of 2–4 carbon atoms, alkoxy of 1–4 carbon atoms, phenyl or phenoxy, exhibit strong fungicidal properties.

It has been furthermore found, in accordance with the present invention, that the particular new compounds of Formula I above may be produced by the process which comprises (a) reacting an alkali metal salt of a para-dialkyl-amino-phenyl-hydrazone of the formula

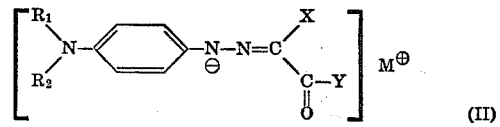

in which

R₁, R₂, X and Y are the same as defined above, and
M is a sodium or potassium cation, optionally in an inert organic solvent, with a derivative of an acid chloride of the formula:

in which A and B are the same as defined above, or (b) reacting a para-dialkylamino-phenyl-hydrazone of the formula:

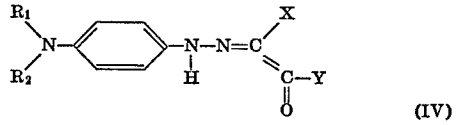

in which R₁, R₂, X and Y are the same as defined above, with an acid chloride derivative of Formula III above in an inert solvent in the presence of an acid-binding agent.

Advantageously, the acyl derivatives of Formula I above according to the present invention exhibit a fungicidal effectiveness which is stronger and, with regard to the activity spectrum, broader, than that of the previously known non-acylated hydrazones. Moreover, the compounds, according to the present invention have a systemic fungicidal mode of action.

In their practical application as fungicides, the known non-acylated hydrazones have the disadvantage of a relatively deep color. The acyl derivatives according to the present invention are, on the other hand, colorless to light yellow in color. Furthermore, the instant acyl derivatives, in contrast to the previously known hydrazones, are distinguished by a substantially lower toxicity to warm-blooded animals (see Table 7 below). Therefore, the active compounds according to the present invention represent a valuable contribution to the art.

If the sodium salt of N-(4-dimethylamino-phenyl)-N'-diacetylcarbonyl-hydrazone and isobutyl chloroformate are used as starting materials, the reaction course according to process variant (a) can be represented by the following formula scheme:

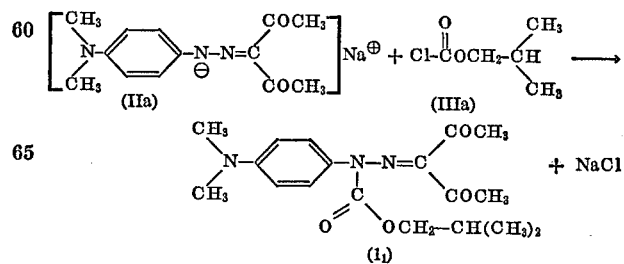

The reaction according to process variant (b) proceeds in analogous manner.

Advantageously, in accordance with the present invention, in the various formulae set forth herein:

X represents
  methylcarbonyl, i.e. acetyl ($-COCH_3$); or cyano;
Y represents
  straight and branched chain lower alkyl hydrocarbon of 1-4 carbon atoms such as methyl, ethyl, n- and iso-propyl, n-, iso-, sec.- and tert.-butyl, and the like, especially $C_{1-3}$ or $C_{1-2}$ alkyl, and more especially methyl; or
  straight and branched chain lower alkoxy of 1-4 carbon atoms such as methoxy, ethoxy, n- and iso-propoxy, n-, iso-, sec.- and tert.-butoxy, and the like, and especially $C_{1-3}$ or $C_{1-2}$ alkoxy;
$R_1$ and $R_2$ each individually represents
  straight and branched chain lower alkyl hydrocarbon of 1-4 carbon atoms such as methyl to tert.-butyl inclusive, as defined above, and the like, especially $C_{1-3}$ or $C_{1-2}$ alkyl, and more especially methyl;
  with the proviso that $R_1$ and $R_2$ when taken together form an alkylene bridge of 4-5 methylene groups such as tetramethylene, i.e. 1',4'-tetramethylene ($-(CH_2)_4-$) and pentamethylene, i.e. 1',5'-pentamethylene ($-(CH_2)_5-$), and especially pentamethylene,
  such that when taken together with the adjacent N-atom the corresponding pyrrolidino or piperidino moiety is formed;
A represents
  oxygen; and
B represents
  straight and branched chain lower alkyl hydrocarbon of 1-10 carbon atoms such as methyl to tert.-butyl inclusive, as defined above, n- and iso-amyl, n- and iso-hexyl, n- and iso-heptyl, n- and iso-octyl, 2,2-dimethyl-hexyl, n- and iso-nonyl, n- and iso-decyl, and the like, especially $C_{1-8}$ or $C_{1-5}$ or $C_{1-4}$ or $C_{1-3}$ or $C_{1-2}$ alkyl, and more especially straight and branched $C_{1-8}$ or $C_{1-5}$ alkyl;
  chloroalkyl of 1-4 carbon atoms such as chloromethyl, ethyl, n- and iso-propyl, n-, iso-, sec.- and tert.-butyl, and the like, especially chloro- $C_{1-3}$ or $C_{2-3}$ or $C_{2-4}$ or $C_{3-4}$ alkyl, and more especially 3-chloro-propyl;
  straight and branched chain lower alkenyl hydrocarbon of 2-4 carbon atoms such as vinyl, prop-1-enyl (γ-allyl), prop-2-enyl (α-allyl), 1-methylvinyl (β-allyl), but-1,2 and 3-enyl, 1-methyl-prop-1-enyl, 2-methyl-prop-1-enyl, 1-methyl-prop-2-enyl (1-methyl-allyl), 2-methyl-prop-2-enyl (2-methyl-allyl), 1-ethyl-vinyl, and the like, especially $C_{3-4}$ alkenyl, and more especially 1-methyl vinyl and 2-prop-1-enyl;
  straight and branched chain lower alkoxy of 1-4 carbon atoms such as methoxy to tert.-butoxy inclusive, as defined above, and the like, and especially $C_{1-3}$ or $C_{1-2}$ alkoxy;
  phenyl; or
  phenoxy.

Preferably, X is methylcarbonyl; or cyano; Y is $C_{1-3}$ alkyl; or $C_{1-3}$ alkoxy; $R_1$ and $R_2$ each individually is $C_{1-3}$ alkyl; or $R_1$ and $R_2$ taken together form an alkylene bridge of 4-5 methylene groups; A is oxygen; and B is $C_{1-8}$ alkyl; or chloro-$C_{1-3}$ alkyl; or $C_{3-4}$ alkenyl; or $C_{1-4}$ alkoxy; or phenyl; or phenoxy.

In particular, X is methylcarbonyl; or cyano; Y is methyl; or $C_{1-2}$ alkoxy; $R_1$ and $R_2$ each individually is methyl; or $R_1$ and $R_2$ taken together form a pentamethylene moiety; A is oxygen; and B is $C_{1-8}$ alkyl; or chloro-$C_{1-3}$ alkyl; or $C_{3-4}$ alkenyl; or $C_{1-4}$ alkoxy; or phenyl; or phenoxy.

The phenyl-hydrazones serving as starting materials are partially known and are clearly characterized by Formula IV above. Their preparation may be effected according to known processes (compare, e.g., Belgian Pat. 594,503, and Angew. Chem. 72, 984 [1960]).

The alkali metal salts of the para-dialkylamino-phenylhydrazones of Formula II above are still new and may be prepared from the appropriate hydrazones of Formula IV by stirring together one equivalent of the hydrazone with one equivalent of sodium or potassium ethylate in ethanol at 0-20° C., concentrating the mixture, washing the precipitated salt with ether, and then drying the salt at a high temperature.

The acid chloride derivatives of Formula III above are generally known.

The inert organic solvent used in either variant may be any suitable one. Examples include nitriles, such as acetonitrile; ketones, such as acetone; formamides, such as dimethyl formamide; ethers, such as diethyl ether, tetrahydrofuran and dioxan; and the like.

In process variant (b), the customary acid binding agents may be used, particularly amines, such as pyridine, N,N-dimethyl-aniline and triethylamine, and inorganic bases, such as sodium hydroxide, potassium carbonate and sodium bicarbonate; and the like.

Depending to some extent on the reactivity of the acid chloride derivative, the reaction temperatures are generally from substantially between about $-30°$ C. to $+30°$, and preferably between about $-10°$ C. to $+20°$ C.

The starting materials are expediently used in in equimolar proportions, the acid chloride derivatives optionally being in excess.

The production reaction is, in general, complete after 4 to 30 hours. The chloride formed in the reaction, for example alkali metal chloride or amine hydrochloride, may be filtered off and the compound of the Formula I may be obtained by concentration of the reaction solution and recrystallization.

Advantageously, as aforesaid, the active compounds according to the present invention exhibit a high degree or fungitoxic activity and a considerable breadth of activity, and possess as well a relatively low toxicity to warm-blooded animals and a concomitantly low phytotoxicity with respect to higher plants. Therefore, the instant compounds are simple to handle and can be used in practice for the control of undesired fungus growth. Their good compatibility with plants permits the instant active compounds also to be applied against fungal diseases of plants by treatment of the standing cultivated plant or individual parts thereof, or of the seed or even of the cultivated soil. The instant active compounds are effective against parasitic fungi on above-the-soil parts of plants, such as Phytophthora species, Peronospora species, Podosphaera species, and the like, and also against fungi which cause tracheomycosis, which attack the plants from the soil, such as Verticillium species, Fusarium species, Phialophora species, and the like. However, the instant compounds also act very well against seed-borne fungi, such as *Tilletia tritici*, and against soil-inhabiting fungi, such as Rhizoctonia species, Fusarium species, Pythium species, Verticillium species, Thielaviopsis species, and the like.

It is particularly to be emphasized that the instant active compounds have a significant systemic activity and are taken up both via the roots and through the leaf surface. Such active compounds are also suitable as leaf fungicides, seed dressings and soil treatment agents.

Moreover, the instant active compounds also have an insecticidal and bird-repellent effect.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals e.g. kaolins, alumina, silica, chalk, i.e. calcium carbonate, talc, kieselguhr, etc.) and ground synthetic mineral (e.g. highly dispersed silicic acid, silicates, e.g. alkali silicates, etc.); whereas the following may be chiefly considered for use as conventional carrier vehicle assistants, e.g. surface active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl aryl-prolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, or herbicides, insecticides, acaricides, bactericides, nematocides, fertilizers, soil structure improving agents, etc., if desired, or in the form of particular dosage preparations for specific application made therefrom such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.001–3.0%, and preferably 0.002–1.0%, by weight of the mixture. Thus, the present invention contemplates over-all compositions which comprise mixtures of a conventional dispersible carrier vehicle such as (1) a dispersible carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally about 0.001–95%, and preferably 0.002–95%, by weight of the mixture.

The active compound can also be used in accordance with the well-known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/ hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 80 or 95% by weight of the active compound, or even the 100% active substance alone, e.g. about 20–100% by weight of the active compound.

In particular, the present invention contemplates methods of selectively killing, combating or controlling fungi, which comprise applying to at least one of (a) such fungi and (b) their habitat, i.e. the locus to be protected, a fungicidally effective or toxic amount of the particular active compound of the invention alone or together with a carrier vehicle as noted above. The instant formulations or compositions are applied in the usual manner, for instance by squirting, spraying atomizing, vaporizing, scattering, dusting, watering, sprinkling, pouring, dry dressing, slurry dressing, moist dressing, wet dressing, and the like.

In the case of seed dressing, the active compound is used, in general, in an amount substantially between about 0.01–10 g., and preferably between about 0.1–3 g., per kilogram of seed. For soil treatment, which may be effected over the whole area, in strips or at point locations, the active compound is generally used, at the place of expected effect, in a concentration substantially between about 3–300 g., and preferably between about 10–100 g., per cubic metre of soil. When treating the above-the-soil parts of plants, the active compound is generally used in a concentration substantially between about 0.001–3.0%, and preferably 0.002–1.0%, by weight, as aforesaid.

It will be realized, of course, that the concentration of the particular active compound utilized, alone or in admixture with the carrier vehicle, will depend upon the intended application, as the artisan will appreciate. Therefore, in special cases, it is possible to go above or below the aforementioned concentration ranges.

The fungicidal effectiveness and mammalian toxicity of the particular new compounds of the present invention is illustrated, without limitation, by the following examples.

EXAMPLE 1

Phytophthora test

Solvent: 4.7 parts by weight acetone
Emulsifier: 0.3 part by weight alkylaryl polyglycol ether
Water: 95 parts by weight The amount of the particular active compound required for the desired final concentration of such active compound in the spray liquid is mixed with the stated amount of solvent and the resulting concentrate is diluted with the stated amount of water containing the stated emulsifier.

Young tomato plants (Bonny best) with 2–6 foliage leaves are sprayed (i.e. treated) with the spray liquid of the given active compound until dripping wet. The plants remain in a greenhouse for 24 hours at 20° C. and at a relative atmospheric humidity of 70%. The tomato plants are then inoculated with an aqueous spore suspension of *Phytophthora infestans*. The plants are then placed in a moist chamber with an atmospheric humidity of 100% and a temperature of 18–20° C.

After 5 days the infestation of the tomato plants is determined as a percentage of the untreated but also inoculated control plants. 0% means no infestation, whereas 100% means that the infestation is exactly as great as in the case of the control plants.

The particular active compounds tested, their concentrations, and the results obtained can be seen from the following Table 1:

TABLE 1

PHYTOPHTHORA TEST

| Active compound No. (See Ex. 8-10) | Infestation [1] |
|---|---|
| (A) $(CH_3)_2-N-\langle\rangle-N=N-CH(CO-CH_3)_2$ (known) | 2 |
| Compound: | |
| ($2_1$) | 0 |
| ($1_2$) | 0.3 |
| ($3_1$) | 0.5 |
| ($4_1$) | 0 |
| ($5_1$) | 0.9 |

[1] As a percentage of the infestation of the untreated control with a concentration of active compound (in percent) of 0.025.

EXAMPLE 2

Plasmopara test

Solvent: 4.7 parts by weight acetone
Emulsifier: 0.3 parts by weight alkylaryl polyglycol ether
Water: 95 parts by weight The amount of the particular active compound required for the desired final concentration of such active compound in the spray liquid is mixed with the stated amount of solvent, and the resulting concentrate is diluted with the stated amount of water which contains the stated emulsifier.

Young potted vines (variety Müller-Thurgau) with 2–6 foliage leaves are sprayed (i.e. treated) with the spray liquid of the given active compound until dripping wet. The plants remain in a greenhouse for 24 hours at 20° C. and a relative atmospheric humidity of 70%. The vines are subsequently inoculated with an aqueous spore suspension of *Plasmopara viticola*. The plants are then placed in a moist chamber with an atmospheric humidity of 100% and a temperature of 20–22° C.

After 5 days, the infestation of the vines is determined as a percentage of the untreated but also inoculated control plants. 0% means no infestation, whereas 100% means that the infestation is exactly as great as in the case of the control plants.

The particular active compounds tested, their concentrations, and the results obtained can be seen from the following Table 2:

TABLE 2

PLASMOPARA TEST

| Active compound No. (See Ex. 8-10) | Infestation [1] |
|---|---|
| (A) $(CH_3)_2-N-\langle\rangle-N=N-CH(CO-CH_3)_2$ (known) | 50 |
| Compound: | |
| ($2_2$) | 35 |
| ($1_3$) | 20 |
| ($3_2$) | 37 |
| ($4_2$) | 33 |
| ($6_1$) | 35 |
| ($5_2$) | 28 |

[1] As a percentage of the infestation of the untreated control with a concentration of active compound (in percent) of 0.0031.

EXAMPLE 3

Phytophthora test [systemic on the leaf]

Solvent: 4.7 parts by weight acetone
Emulsifier: 0.3 parts by weight alkylaryl polyglycol ether
Water: 95 parts by weight The amount of the particular active compound required for the desired final concentration of such active compound in the spray liquid is mixed with the stated amount of solvent, and the resulting concentrate is diluted with the stated amount of water containing the stated emulsifier.

From tomato plants, in each case, 3 pinnules are removed, placed in a dish, brought into a moist chamber and inoculated with a spore suspension of *Phytophthora infestans*. The dishes are then stored for 6 hours at +20° C. The individual pinnules are subsequently immersed (i.e. treated) for 15 seconds in an aqueous suspension with the desired concentration of the given active compound. The treated pinnules are brought back into the moist chamber.

After an incubation period of 48 hours at +20° C., the infestation of the leaves is determined as a percentage of the untreated but also inoculated control leaves. 0% means no infestation, whereas 100% means that the infestation is exactly as great as in the case of the control leaves.

The particular active compounds tested, their concentrations, and the results obtained can be seen from the following Table 3:

TABLE 3

Phytophthora test (systemic on the leaf)

| Active compound No. (See Ex. 8-10) | Infestation [1] |
|---|---|
| (A) $(CH_3)_2-N-\langle\rangle-N=N-CH(CO-CH_3)_2$ (known) | 67 |
| Compound: | |
| ($2_3$) | 3 |
| ($1_4$) | 15 |
| ($7_1$) | 37 |
| ($3_3$) | 3 |
| ($4_3$) | 0 |
| ($5_3$) | 26 |

[1] As a percentage of the infestation of the untreated control with a concentration of active compound (in percent of 0.1.)

EXAMPLE 4

Phytophthora test [systemic]

Solvent: 4.7 parts by weight acetone
Emulsifier: 0.3 parts by weight alkylaryl polyglycol ether
Water: 95 parts by weight The amount of the particular active compound required for the desired final concentration of such active compound in the spray liquid is mixed with the stated amount of solvent, and the resulting concentrate is diluted with the stated amount of water containing the stated emulsifier.

Young tomato plants (Bonny best) which have 3–5 foliage leaves and which have been potted in standard soil are treated with the spray liquid of the given active compound three times at intervals of 24 hours in each case and in such a manner that, in each case, only the soil in the pot is completely saturated. 24 hours after the last watering, the plants are incubated with an aqueous zoosporangia suspension of the fungus *Phytophthora infestans*. The plants are then placed in a moist chamber with an atmospheric humidity of 100% and a temperature of 18–20° C.

After 5 days the infestation of the tomato plants is determined as a percentage of the untreated but also inoculated control plants. 0% means no infestation, whereas 100% means that the infestation is exactly as great as in the case of the control plants.

The particular active compounds tested, their concentrations, and the results obtained can be seen from the following Table 4:

TABLE 4

Phytophthora test (systemic)

| Active compound No. (See Ex. 8-10) | Infestation [1] |
|---|---|
| (A) $(CH_3)_2-N-\langle\rangle-N=N-CH(CO-CH_3)_2$ (known) | 100 |
| Compound: | |
| ($2_4$) | 39 |
| ($3_4$) | 38 |
| ($4_4$) | 53 |

[1] As a percentage of the infestation of the untreated control with a concentration of active compound (in percent) of 0.120.

EXAMPLE 5

Soil treating agent test/*Pythium ultimum*

To produce a suitable preparation of the particular active compound, such active compound is extended with talc to a content of 5% and subsequently with quartz sand to a content of 0.5% of active compound.

The preparation of the given active compound is uniformly mixed with naturally infected compost soil which, when sown with wrinkled canning peas, is known from experience to lead to high losses of seedlings through *Pythium ultimum* infection. The soil is filled into 5 pots, each of which is sown with 10 seeds of the wrinkled canning pea. The pots are placed in a greenhouse at 15–18° C. and kept normally moist.

3 weeks after sowing, the number of healthy plants is determined as a percentage of the seeds sown. 0% means that no healthy plants have grown, whereas 100% means that healthy plants have resulted from all the seeds.

The particular active compounds tested, their concentrations in the soil, and the results obtained can be seen from the following Table 5:

TABLE 5
Soil treating agent test (*Pythium ultimum*)

| Active compound No. (See Ex. 8-10) | Concentration of active compound in mg./liter of soil | Quantity of healthy plants in percent |
|---|---|---|
| Control | | 0 |
| Compound: | | |
| (2₅) | 100 | 82 |
| | 25 | 66 |
| | 5 | 62 |
| (1₅) | 100 | 54 |
| (8₁) | 100 | 76 |
| | 25 | 54 |
| | 5 | 46 |
| (9₁) | 100 | 88 |
| | 25 | 86 |
| | 5 | 44 |
| (7₂) | 100 | 76 |
| | 25 | 54 |
| (3₅) | 100 | 84 |
| | 25 | 62 |
| (4₅) | 100 | 84 |
| | 25 | 62 |
| (10₁) | 100 | 76 |
| | 25 | 62 |
| | 5 | 58 |
| (5₄) | 100 | 86 |
| | 25 | 48 |
| | 5 | 34 |
| (11₁) | 100 | 74 |
| | 25 | 40 |
| (12₁) | 100 | 66 |
| | 25 | 54 |
| (13₁) | 100 | 78 |
| | 25 | 74 |
| | 5 | 32 |
| (14₁) | 100 | 86 |
| | 25 | 54 |
| | 5 | 38 |
| (15₁) | 100 | 82 |
| | 25 | 62 |
| | 5 | 46 |
| (16₁) | 100 | 64 |
| | 25 | 52 |
| (17₁) | 100 | 46 |
| | 25 | 36 |
| (18₁) | 100 | 44 |
| (19₁) | 100 | 62 |
| | 25 | 60 |
| | 5 | 30 |

EXAMPLE 6

Seed dressing test/bunt of wheat (seed-born mycosis)

To produce a suitable dry dressing, the particular active compound is extended with a mixture of equal parts by weight of talc and kieselguhr to give a finely powdered mixture with the desired concentration of such active compound.

Wheat seed is contaminated with 5 g. of the chlamydospores of *Tilletia caries* per kg. of seed. To apply the given active compound dressing, the seed is shaken with the dressing in a closed glass flask. The seed, on moist loam under a cover of a layer of muslin and 2 cm. of moderately moist compost soil, is exposed to optimum germination conditions for the spores for 10 days at 10° C. in a refrigerator.

The germination of the spores on the wheat grains, each of which is contaminated with about 100,000 spores, is subsequently determined microscopically. The smaller the number of spores which have germinated, the more effective is the given active compound.

The particular active compounds tested, their concentrations in the dressing, the amounts of dressing used and the percentage spore germination can be seen from the following Table 6:

TABLE 6
Seed dressing test (Bunt of wheat)

| Active compound No. (See Ex. 8-10) | Concentration of active compound in seed dressing in percent | Amount of dressing applied in g./kg. of seed | Spore germination in percent |
|---|---|---|---|
| Undressed | | | 10 |
| Compound: | | | |
| (2₅) | 30 | 1 | 0.000 |
| (1₅) | 30 | 1 | 0.05 |
| (9₂) | 30 | 1 | 0.000 |
| | 10 | 1 | 0.005 |
| | 3 | 1 | 0.05 |
| (7₃) | 30 | 1 | 0.005 |
| (3₆) | 30 | 1 | 0.05 |
| (10₂) | 30 | 1 | 0.005 |
| | 10 | 1 | 0.005 |
| | 3 | 1 | 0.05 |
| (5₅) | 30 | 1 | 0.005 |
| | 10 | 1 | 0.05 |
| (13₂) | 30 | 1 | 0.05 |
| (14₂) | 30 | 1 | 0.05 |
| (20₁) | 35 | 1 | 0.05 |

EXAMPLE 7

The toxicity to warm-blooded animals of a previously known compound and typical compounds according to the present invention as ascertained in the usual manner may be seen from the following Table 7:

TABLE 7
Toxicity

| Active compound No. (See Ex. 8-10) | LD₅₀ values (mg./kg. mouse per os) |
|---|---|

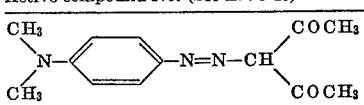

| | 25–50 |

(known from Belgian Patent 594,503)

| According to the invention—Compound: | |
|---|---|
| (3₇) | >1,000 |
| (6₂) | >1,000 |
| (11₂) | >1,000 |
| (12₂) | >2,000 |

The following further examples are set forth to illustrate, without limitation, the process for producing the instant active compounds according to the present invention:

EXAMPLE 8

(a) 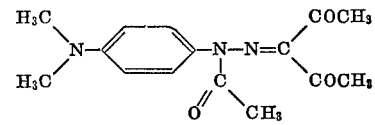 (27)

107.6 g. (0.4 mol) of dry sodium salto f N-(4-dimethylaminophenyl)-N'-diacetylcarbonyl-hydrazone are suspended in 1 litre of acetonitrile, and 31.4 g. (0.4 mol) of freshly distilled acetyl chloride, dissolved in 50 ml. acetonitrile, are added dropwise at 10° C., with stirring. Stirring is continued for 1 hour at 0 to 10° C. and then for 3 hours at room temperature. Filtration from sodium chloride is effected and the brown-red filtrate is concentrated in a vacuum. The oily residue is repeatedly recrystallized hot from 300 ml. isopropanol until any starting product still present is separated. 70 g. (60% of the theory) N-acetyl-[diacetylcarbonyl - (4-dimethylamino)-phenylhydrazone] are obtained as yellow needles of M.P. 151° C.

(b) Preparation of the sodium salt used as starting material:

247 g. (1 mol) of finely powdered N-(4-dimethylaminophenyl)-N'-diacetylcarbonyl-hydrazone are introduced into a freshly prepared solution of sodium ethylate (23 g. sodium in 1.5 litres of ethanol) and then stirred for 12 hours at room temperature. The precipitated Na salt is filtered off with suction and suspended in 1.5 litres of benzene. 0.8 litre of the benzene is then distilled off; new benzene is added and again distilled off in order to remove ethanol and water azeotropically. The sodium salt is filtered off with suction from the residual benzene, washed with ether and dried at 60° C. in a vacuum.

EXAMPLE 9

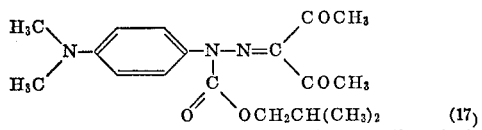

269 g. (1 mol) of dry sodium salt of N-(4-dimethylaminophenyl)-N'-diacetylcarbonyl-hydrazone are suspended in 2 litres of acetonitrile, and 150 g. (1.1 mols) chloroformic acid isobutyl ester, dissolved in 100 ml. acetonitrile, are added dropwise at −20° C., with stirring. Stirring is effected for 2 hours at −10 to −20° C., and then for 3 hours at room temperature. Filtration from the sodium chloride formed is then effected and the filtrate is concentrated in a vacuum. The oily, red-brown residue is taken up in 300 ml. of boiling ligroin and the slurry of crystals which separates after cooling is pressed sharply and recrystallized repeatedly from ligroin, 112 g. (32% of the theory) N-carboisobutoxy-[diacetylcarbonyl-(4-dimethylamino)-phenylhydrazone] are obtained as yellow scales of M.P. 103° C.

EXAMPLE 10

In manner analogous with that described in Examples 8 and 9, the following compounds according to Formula I above are also prepared.

TABLE 8

| Compound No. | $R_1$ | $R_2$ | X | Y | A | B | M.P., °C. |
|---|---|---|---|---|---|---|---|
| ($8_2$) | $CH_3$ | $CH_3$ | CN | $OC_2H_5$ | O | $OCH_3$ | 190 |
| ($21_1$) | $CH_3$ | $CH_3$ | $COCH_3$ | $CH_3$ | O | $OC_6H_5$ | 153–154 |
| ($9_3$) | $CH_3$ | $CH_3$ | CN | $OC_2H_5$ | O | $OC_6H_5$ | 114 |
| ($7_4$) | $CH_3$ | $CH_3$ | CN | $OC_2H_5$ | O | $OCH_2CH(CH_3)_2$ | 146 |
| ($3_5$) | $CH_3$ | $CH_3$ | $COCH_3$ | $CH_3$ | O | $OCH_3$ | 143 |
| ($4_6$) | $CH_3$ | $CH_3$ | $COCH_3$ | $CH_3$ | O | $OC_2H_5$ | 127 |
| ($6_3$) | $CH_3$ | $CH_3$ | $COCH_3$ | $CH_3$ | O | (phenyl) | 197 |
| ($10_5$) | $CH_3$ | $CH_3$ | $COCH_3$ | $CH_3$ | O | $C_2H_5$ | 130 |
| ($5_6$) | $CH_3$ | $CH_3$ | $COCH_3$ | $CH_3$ | O | $C_3H_7$-n | 132 |
| ($11_1$) | $CH_3$ | $CH_3$ | $COCH_3$ | $CH_3$ | O | $-CH_2CH_2CH_2-Cl$ | 129–131 |
| ($12_3$) | $CH_3$ | $CH_3$ | $COCH_3$ | $CH_3$ | O | $CH=C(CH_3)_2$ | 137–139 |
| ($13_3$) | $CH_3$ | $CH_3$ | $COCH_3$ | $CH_3$ | O | $CH(CH_3)_2$ | 147 |
| ($14_3$) | $CH_3$ | $CH_3$ | $COCH_3$ | $OC_2H_5$ | O | $C_2H_5$ | 128–130 |
| ($15_2$) | $CH_3$ | $CH_3$ | $COCH_3$ | $OC_2H_5$ | O | $CH_3$ | 155–158 |
| ($23_1$) | $CH_3$ | $CH_3$ | CN | $OC_2H_5$ | O | $CH_3$ | 156 |
| ($24_1$) | $CH_3$ | $CH_3$ | CN | $OC_2H_5$ | O | $C_2H_5$ | 129 |
| ($16_2$) | $CH_3$ | $CH_3$ | CN | $OC_2H_5$ | O | (phenyl) | 184 |
| ($18_2$) | $CH_3$ | $CH_3$ | $COCH_3$ | $CH_3$ | O | $-CH_2-C(CH_3)(CH_2)_3-CH_3$ with $CH_3$ | Oil |
| ($19_2$) | $CH_3$ | $CH_3$ | $COCH_3$ | $CH_3$ | O | $-C(CH_3)=CH_2$ | 167–169 |
| ($20_2$) | $-(CH_2)_5-$ | | $COCH_3$ | $CH_3$ | O | $CH_3$ | 116–118 |

The following compounds are particularly preferred:

(1) N-carboisobutoxy-[diacetylcarbonyl-(4-dimethylamino)-phenylhydrazone]
(2) N-acetyl-[dicetylcarbonyl-(4-dimethylamino-(phenylhydrazone]
(9) N-carbophenoxy-[(cyano-carboethoxy)-carbonyl-(4-dimethylamino)-phenylhydrazone]
(11) N-carbo-(3'-chloro-propyl)-[diacetylcarbonyl-(4-dimethylamino)-phenylhydrazone]
(12) N-carbo-(2'-methyl-prop-1'-enyl)-[diacetylcarbonyl-(4-dimethylamino)-phenylhydrazone]
(16) N-benzoyl-[(cyano-carboethoxy)-carbonyl-(4-dimethylamino)-phenylhydrazone]
(20) N-acetyl-[diacetylcarbonyl-(4-piperidino)-phenylhydrazone]

It will be realized by the artisan that all of the foregoing compounds contemplated by the present invention possess the desired strong fungicidal properties, with regard to a broad spectrum of activity, as well as a comparatively low toxicity toward warm-blooded creatures and a concomitantly low phytotoxicity with respect to higher plants, enabling such compounds to be used with correspondingly favorable compatibility with respect to warm-blooded creatures and higher plants for more effective control and/or elimination of fungi by application of such compounds to such fungi and/or their habitat.

It will be appreciated that the instant specification and examples are set forth by way of illustration and not limitation, and that various modifications and changes may be made without departing from the spirit and scope of the present invention.

What is claimed is:
1. N-acyl-4-dialkylamino-phenyl-hydrazone of the formula

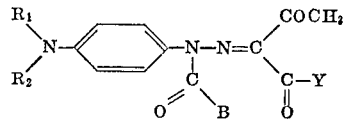

in which Y is selected from the group consisting of alkyl of 1–4 carbon atoms and alkoxy of 1–4 carbon atoms, $R_1$ and $R_2$ each individually is alkyl of 1–4 carbon atoms, with the proviso that $R_1$ and $R_2$ when taken together form an alkylene bridge having 4–5 methylene groups, and B is selected from the group consisting of alkyl of 1–10 carbon atoms, chloroalkyl of 1–4 carbon atoms, alkenyl of 2–4 carbon atoms, and phenyl.

2. Compound according to claim 1 wherein Y is selected from the group consisting of $C_{1-3}$ alkyl and $C_{1-3}$ alkoxy, $R_1$ and $R_2$ each individually is $C_{1-3}$ alkyl, with the proviso that $R_1$ and $R_2$ when taken together form an alkylene bridge having 4–5 methylene groups and B is selected from the group consisting of $C_{1-8}$ alkyl, chloro-$C_{1-3}$ alkyl, $C_{3-4}$ alkenyl and phenyl.

3. Compound according to claim 1 wherein Y is selected from the group consisting of methyl and $C_{1-2}$ alkoxy, $R_1$ and $R_2$ each individually is methyl, with the proviso that $R_1$ and $R_2$ when taken together form the 1',5'-pentamethylene group, and B is selected from the group consisting of $C_{1-8}$ alkyl, chloro-$C_{1-3}$ alkyl, $C_{3-4}$ alkenyl and phenyl.

4. Compound according to claim 1 wherein such compound is N-acetyl-N-(4-dimethylamino-phenyl)-N'-diacetylcarbonyl hydrazone of the formula

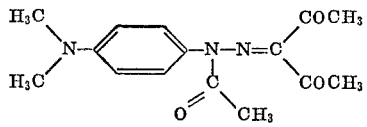

5. Compound according to claim 1 wherein such compound is N-carbo-(3'-chloro-propyl)-N-(4-dimethylamino-phenyl)-N'-diacetylcarbonyl-hydrazone of the formula

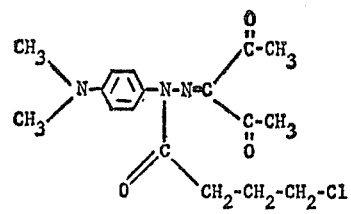

6. Compound according to claim 1 wherein such compound is N-carbo-(2'-methyl-prop-1'-enyl)-N-(4-dimethylamino - phenyl) - N' - diacetylcarbonyl hydrazone of the formula

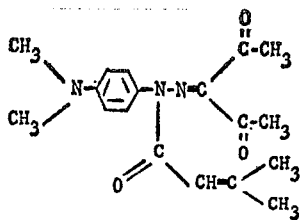

7. Compound according to claim 1 wherein such compound is N-acetyl-N-(4-piperidino-phenyl)-N'-(diacetylcarbonyl)-hydrazone of the formula

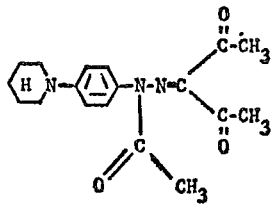

References Cited
UNITED STATES PATENTS 3,060,192 10/1962 Bernstein et al. ____ 260—562 H HENRY R. JILES, Primary Examiner H. I. MOATZ, Assistant Examiner U.S. Cl. X.R.

260—293.79, 326.3, 326.5 J, 465 E, 471 R, 558 H, 562 H, 293.74, 293.75; 424—267, 274, 300, 304, 324